United States Patent [19]

White, III

[11] Patent Number: 4,993,031
[45] Date of Patent: Feb. 12, 1991

[54] BROADBAND RAMAN BEAM COMBINER

[75] Inventor: Frederic H. White, III, Poway, Calif.

[73] Assignee: The United States of America as represented by the Secretary of the Air Force, Washington, D.C.

[21] Appl. No.: 487,369

[22] Filed: Mar. 1, 1990

[51] Int. Cl.[5] .................................. H01S 3/30
[52] U.S. Cl. ........................ 372/3; 307/426; 330/4.3
[58] Field of Search ............ 372/3; 307/426; 330/4.3

[56] References Cited

U.S. PATENT DOCUMENTS

| | | | |
|---|---|---|---|
| H742 | 2/1990 | Bobbs et al. | 372/3 |
| 4,635,263 | 1/1987 | Mollenauer | 372/3 |
| 4,717,842 | 1/1988 | Komine | 307/426 |
| 4,740,974 | 4/1988 | Byron | 372/3 |
| 4,742,522 | 5/1988 | Linford | 372/2 |
| 4,822,495 | 5/1990 | Bobbs et al. | 372/3 |
| 4,829,528 | 5/1989 | Band et al. | 372/3 |

Primary Examiner—Leon Scott, Jr.
Attorney, Agent, or Firm—Robert L. Nathans; Donald J. Singer

[57] ABSTRACT

Raman cell beam combining apparatus for combining a seed beam with a pump beam being introduced into the Raman cell, and employing a segmented mirror for substantially correcting the relative tilt of individual incremental portions of the wavefront of the pump beam with respect to the wavefront of the seed beam, and such mirror having an array of flat non-coplanar wavefront shifting elements positioned parallel with respect to each other.

19 Claims, 2 Drawing Sheets

BROADBAND RAMAN BEAM COMBINER

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of coherent light amplifiers.

Of the two general method of Raman beam combining, namely dichroic beam splitting mirrors, and angular multiplexing, angular multiplexing is attractive since the separate pump and seed beams can follow separate paths through the Raman cell. Unfortunately, the Raman process is "imperfect" for geometries in which the pump and seed beams are not collinear. For these cases, the relative tilt between the pump beam and the seed beam can generate, in the simplest geometries, a wavelength-dependent tilt on the amplified wavefront of the seed beam output. The amount of the unwanted seed beam tilt can be approximated by $$\text{Tilt}\bigg|_{\text{Seed}} \approx \frac{\Delta\lambda}{2\lambda} \text{Tilt}\bigg|_{\text{Pump}} \quad (1)$$

where $\Delta\lambda$ is the bandwith of the broadband pump of wavelength $\lambda$ and Tilt/pump is the relative angle between the pump beam and the seed beam. This effect is not correctable with conventional beam control techniques and can be significant.

SUMMARY OF THE INVENTION

The aforesaid problem is corrected in accordance with the invention, by providing tilt correction means for correcting the relative tilt of individual portions of the wavefront of the pump beam with respect to the wavefront of the seed beam, before the pump and seed beams are introduced into the Raman cell. The tilt correction means of the invention preferably includes a segmented mirror having a plurality of flat stairstep like segments for spatially displacing incremental portions of the wavefront of the pump beam to perform the desired correction.

BRIEF DESCRIPTION OF THE DRAWINGS

Other objects features and advantages of the present invention will become apparent upon study of the following detailed description taken in conjunction with the drawings in which.

SPECIFIC DESCRIPTION

The amplification of a seed beam by combining it with a pump beam in a Raman cell is well known to those skilled in the art and reference may be made to the appropriate patent literature for a description of this operation. See for example, U.S. Pat. Nos. 4,717,842 and 4,740,974, and the literature cited therein.

Figure 1:
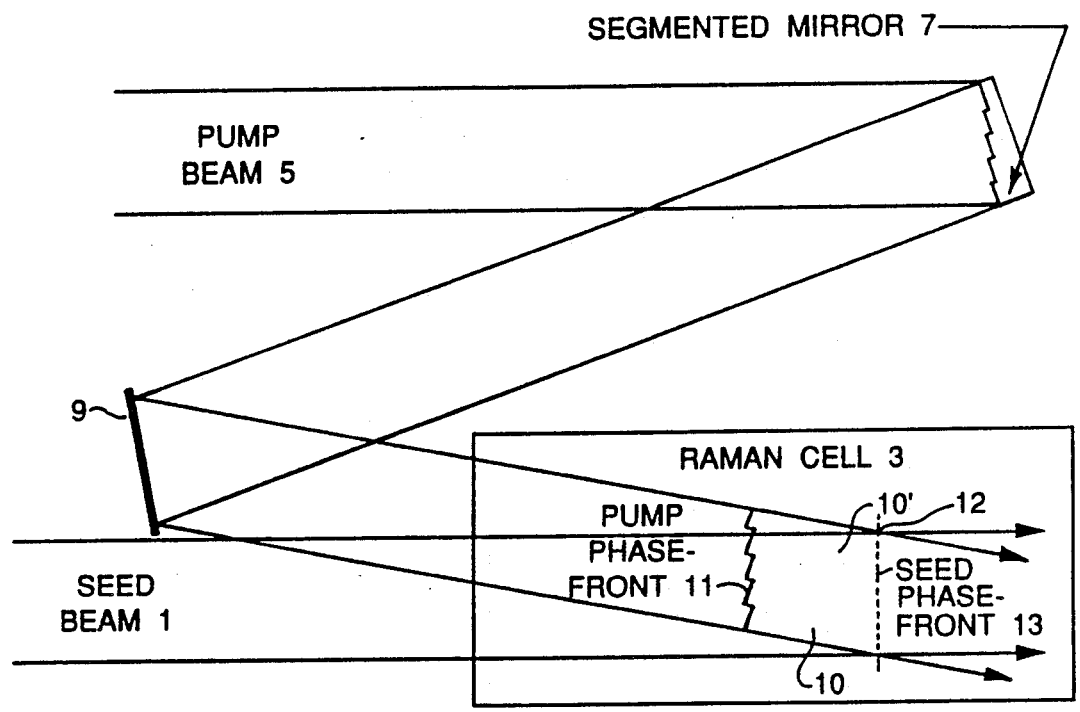
FIG. 1 schematically illustrates a first embodiment of the invention.

In FIG. 1, seed beam 1 is introduced into Raman cell 3 and is combined with pump beam 5 which is first directed against segmented mirror 7 and thereafter against relay mirror 9 and is introduced into cell 3. The function of the segmented mirror is to shift or spatially displace discrete portions of the pump beam in a manner to produce a stepped wavefront illustrated at 11, so that when the wavefront of the pump beam interacts with the wavefront of the seed beam at 12, the aforesaid correction will be made to produce the flat seed wavefront 13. Thus lower incremental portions of the pump wavefront in the vicinity of portion 10 are displaced or shifted forward to a greater degree than upper portions of the beam at 10'.

The pump and seed beams meet within cell 3 at a relative tilt angle characteristic of angular multiplexing approaches, as understood by workers in the art. Segmented mirror 7 thus applies the optimum piston-only segmented correction to the pump beam. These piston-only segmented corrections produced by segmented mirror 7, minimizes the pump beam optical path difference (OPD) with respect to the seed wavefront reference, and the resulting wavelength dependent seed OPD is thus minimized. It is a feature of the invention that by using only piston-only correction to the wavefront to the pump beam, its appropriate direction is preserved to permit proper propagation through Raman cell 3. This is analagous to the fixed direction of motion of an engine piston as it changes position, along the length of a cylinder. The number of segments making up the stair-step like surface of segmented mirror 7 is chosen so as to reduce the resultant wavelength-dependent seed OPD to an acceptable level. Thus the tilt correction means provides substantial correction of the relative tilt rather than perfect correction.

Figure 2A:
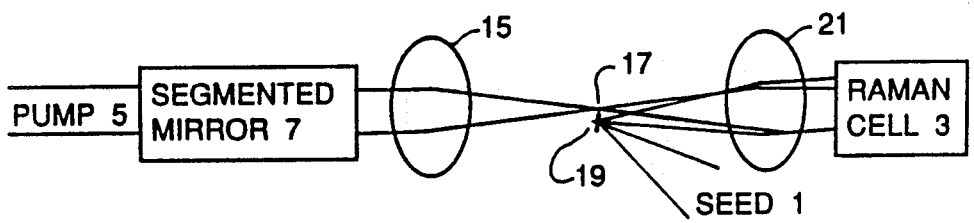
FIG. 2a, 2b, and 2c illustrate alternate embodiments of the invention.
Figure 2B:
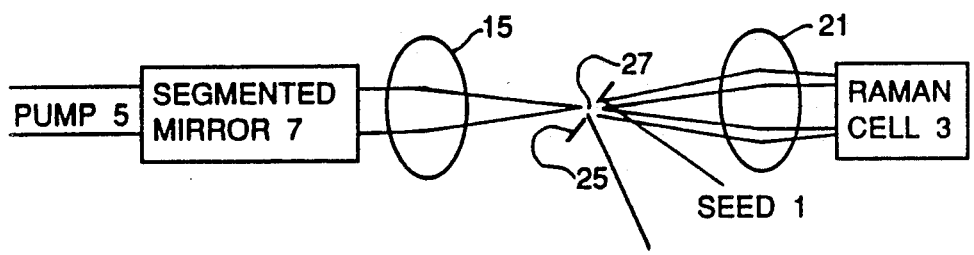
Figure 2C:
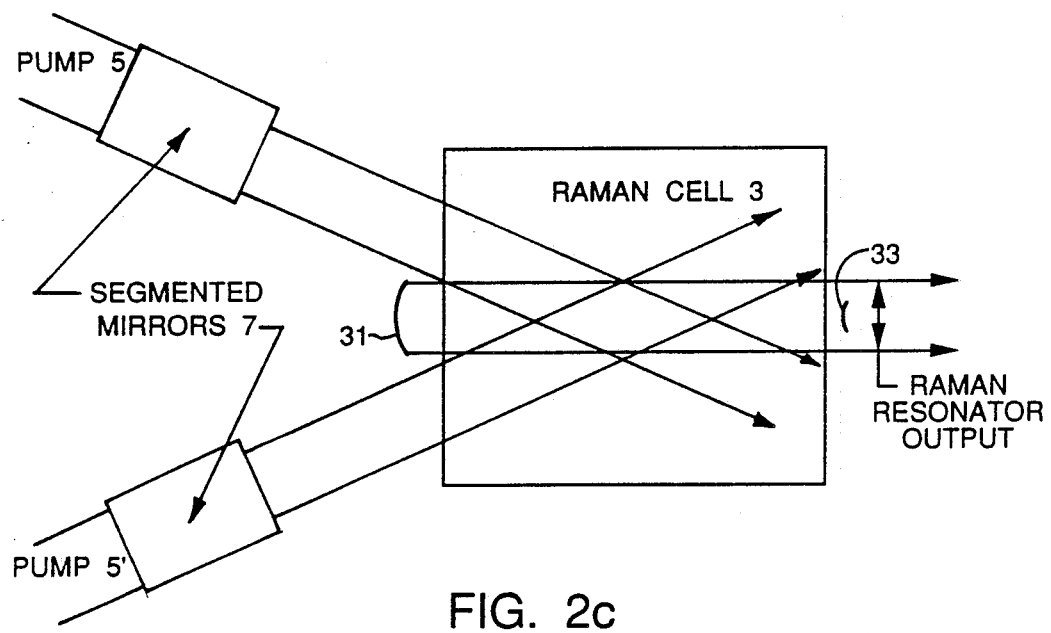

Aside from the simplified schematic shown in FIG. 1, and its extension to multiple beams, the segmented pump corrector can be used in the geometries depicted schematically in FIG. 2a through 2c. In FIG. 2a, the pump is sent through focus by a telescope (lenses or mirrors). Near the focus, the seed is inserted into the beam so that, at the Raman cell, the beams overlap. The segmented mirror is used to correct the pump for its relative wavefront tilt with respect to the seed.

More specifically, pump beam 5 is reflected off of segmented mirror 7 and passes through a focusing lens or mirror 15 and is focused at 17, and is thereafter directed at collimating lens 21. Seed beam 1 is reflected off of mirror 19 positioned adjacent the point of focus at 17 in order to combine the seed beam with the pump beam before they pass through collimating lens 21, and thereafter through Raman cell 3.

A variation of this approach is shown in FIG. 2b, wherein the pump beam focuses through a mirror with a hole in it, and the seed beam is injected by reflection from this mirror. Here the pump has no relative misalignment with respect to the seed; instead, it has a different divergence with respect to the seed. Again, the segmented mirror is used to minimize the pump's OPD with respect to the seed. More specifically, pump beam 5 is reflected off of segmented mirror 7 and is focused by lens 15 at aperture 27 formed within mirror 25, which deflects seed beam 1 to cause it to be introduced into collimating lens 21 along with the pump beam.

Figure 3:
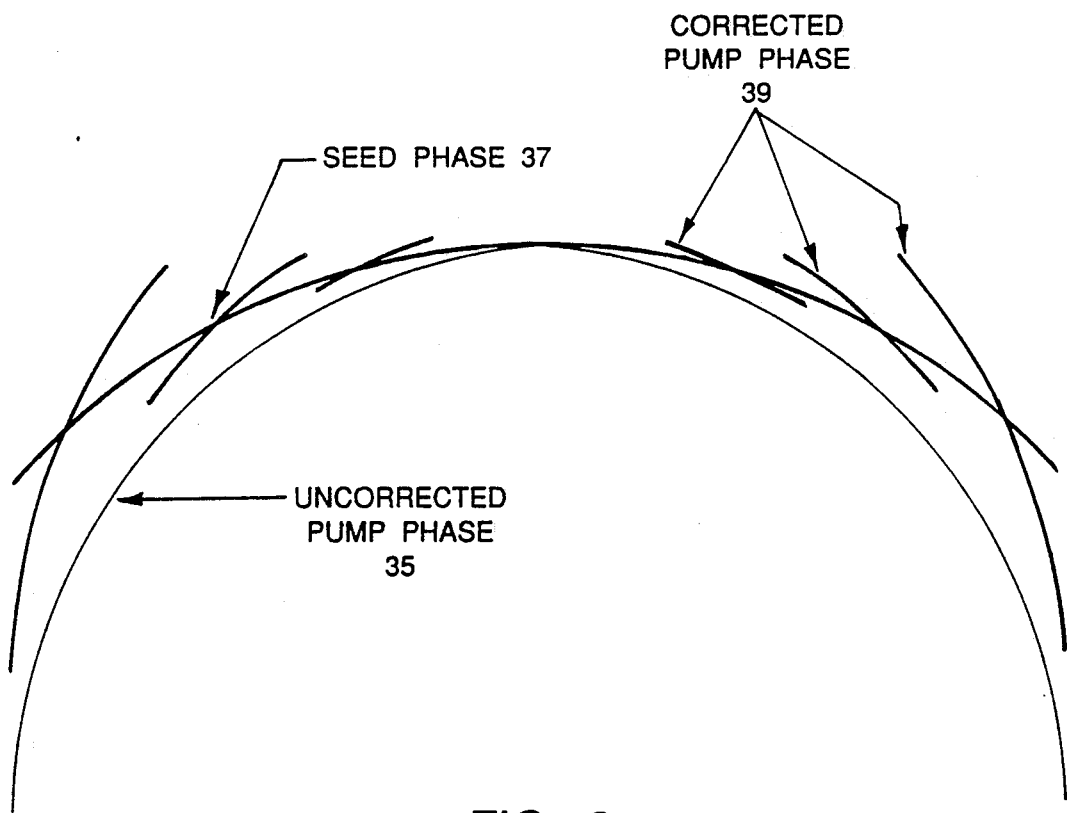
FIG. 3 illustrates wavefront correction performed by the segmented mirrors.

Shown schematically in FIG. 3, is the seed phase 37, the pump phase 35 without correction, and the pump phase 39 after correction, just before both pump and seed enter the recollimating lens 21. Note that for systems shown schematically in FIGS. 2a and 2b, the beams in the Raman cell are approximately collinear, but both may be converging in the Raman cell. In addition, multiple pumps could be used, especially with FIG. 2a, with each having its own segmented mirror corrector.

FIG. 2c schematically shows the segmented correction for broadband pumps 5 and 5' applied to the Raman Resonator, developed at Western Research, San Diego. Here, the segmented mirrors 7 are most effective at correcting the collimated pass of the resonator. However, with the broadband pump, gain on the diverging pass is slight, causing little OPD for the Raman-shifted resonator output. The pump correction is also suitable for the amplifier version of the Raman Resonator, in which a small hole is made in one of the two resonator mirrors 31 and 33, and a seed beam is injected for amplification within cell 3.

As will be apparent to the worker in the art, the specific implementation of the segmented mirror pump beam corrector will be dependent on the particular configuration geometry and the $\Delta\lambda/\lambda$ of the laser used. Because of the $\Delta\lambda/\lambda$ factor (see Equation 1) for coupling between pump phase and seed phase, a relatively coarse correction of the pump is required. Because the gross deliberate "misalignments" between pump and seed are static, a static correction, based on measured relative tilts, would be sufficient. The tilt data might be generated during static or installation alignment. The piston OPD can be generated by other than a segmented mirror. For example, a segmented window with tilt control could be used. Combinations of segmented windows and mirrors could also be an effective implementation. Because the correction is for relative tilts across the wavefronts, Hartmann-type sensors are particularly attractive.

Hartmann-type sensors for measuring the tilt of an optical wavefront are well-known to workers in the art. See for example p. 1454 of Van Nostrand's Scientific Encyclopedia, sixth edition, and "Principles of Optics"; Hardy and Perrin, at p. 382.

While preferred embodiments of the present invention have been described, numerous variations will be apparent to the skilled worker in the art, and thus the scope of the invention is to be restricted only by the terms of the following claims and art recognized equivalents thereof.

What is claimed is:

1. A Raman cell beam combiner apparatus comprising:
   (a) combining means for combining a seed beam with a pump beam being introduced into a Raman cell; and
   (b) tilt correction means for individually spatially displacing discrete portions of the wavefront of said pump beam with respect to the wavefront of said seed beam as said pump beam and said seed beam are introduced into said Raman cell wherein said tilt correction means includes an array of piston-like wavefront shifting elements in order to produce a flat wavefront output.

2. The apparatus of claim 1 wherein said tilt correction means comprises a segmented mirror.

3. The apparatus of claim 2 wherein said combining means includes a pump beam focusing element having a given focal point, a beam collimating element and a seed beam mirror means positioned adjacent the focal point of said pump beam focusing element for directing said seed beam through said collimating element along with said pump beam.

4. The apparatus of claim 3 wherein said seed beam mirror means has a light transmitting aperture positioned about said pump beam adjacent said given focal point for permitting said pump beam to pass therethrough.

5. The apparatus of claim 1 wherein said combining means includes a pump beam focusing element having a given focal point, a beam collimating element and a seed beam mirror means positioned adjacent the focal point of said pump beam focusing element for directing said seed beam through said collimating element along with said pump beam.

6. The apparatus of claim 5 wherein said seed beam mirror means has a light transmitting aperture positioned about said pump beam adjacent said given focal point for permitting said pump beam to pass therethrough.

7. The apparatus of claim 1 wherein said combining means includes a pump beam focusing element having a given focal point, a beam collimating element and a seed beam mirror means positioned adjacent the focal point of said pump beam focusing element for directing said seed beam through said collimating element along with said pump beam.

8. The apparatus of claim 7 wherein said seed beam mirror means has a light transmitting aperture positioned about said pump beam adjacent said given focal point for permitting said pump beam to pass therethrough.

9. The apparatus of claim 1 wherein said wavefront shifting elements are formed in a stairstep configuration 10. A Raman cell beam combining apparatus comprising:
    (a) combining means for combining a seed beam with a pump beam being introduced into said Raman cell;
    (b) tilt correction means for substantially correcting the relative tilt of individual incremental portions of the wavefront of said pump beam with respect to the wavefront of said seed beam before said pump beam and said seed beam are introduced into said Raman cell; and
    (c) wherein said correction means includes an array of flat non-coplanar wavefront shifting elements positioned parallel with respect to each other.

11. The apparatus of claim 10 wherein said correction means is a segmented mirror.

12. The apparatus of claim 11 wherein said wavefront shifting elements are formed in a stairstep configuration.

13. The apparatus of claim 10 wherein said wavefront shifting elements are formed in a stairstep configuration.

14. A Raman cell beam combiner apparatus comprising:
    (a) combining means for combining a seed beam with a pump beam being introduced into said Raman cell; and
    (b) tilt correction means for individually and progressively increasing the degree of displacement of discrete portions of the wavefront of said pump beam with respect to the wavefront of said beam as said pump beam and said seed beam are introduced into said Raman cell in order to produce a flat wavefront output.

15. The apparatus of claim 14 wherein said tilt correction means includes an array of piston-like wavefront shifting elements.

16. The apparatus of claim 15 wherein said tilt correction means comprises a segmented mirror.

17. The apparatus of claim 15 wherein said combining means includes a pump beam focusing element having a given focal point, a beam collimating element and a seed beam mirror means positioned adjacent the focal point of said pump beam focusing element for directing said seed beam through said collimating element along with said pump beam.

18. The apparatus of claim 15 wherein said wavefront shifting elements are formed in a stairstep configuration.

19. The apparatus of claim 14 wherein said combining means includes a pump beam focusing element having a given focal point, a beam collimating element and a seed beam mirror means positioned adjacent the focal point of said pump beam focusing element for directing said seed beam through said collimating element along with said pump beam.

* * * * *